May 8, 1945. C. M. OSTERHELD 2,375,379
WATER HEATER CONTROL SYSTEM AND THERMAL RETARDER THEREFOR
Filed Nov. 22, 1943 3 Sheets-Sheet 3
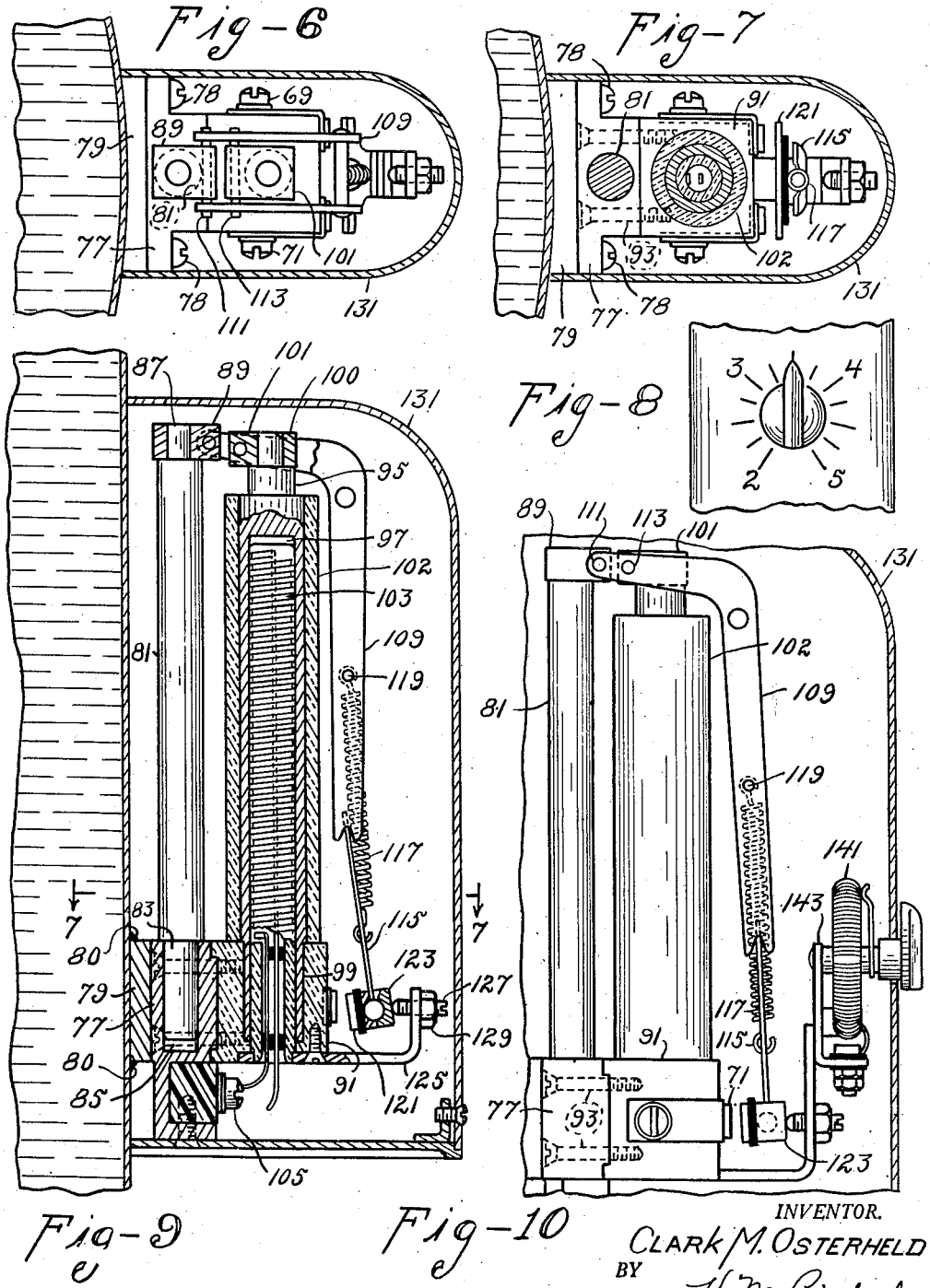
INVENTOR.
CLARK M. OSTERHELD
BY
H. M. Biebel
ATTORNEY Patented May 8, 1945

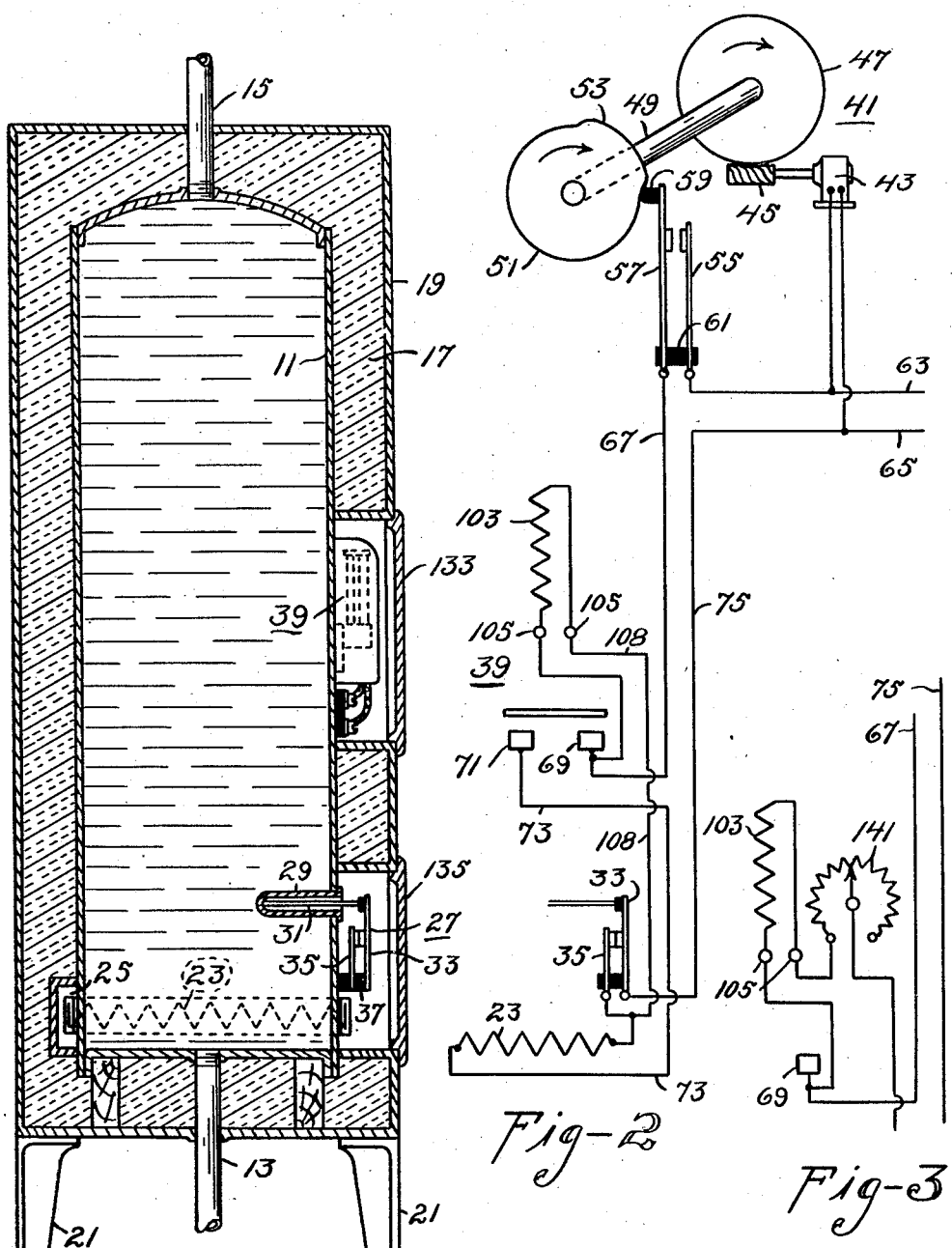

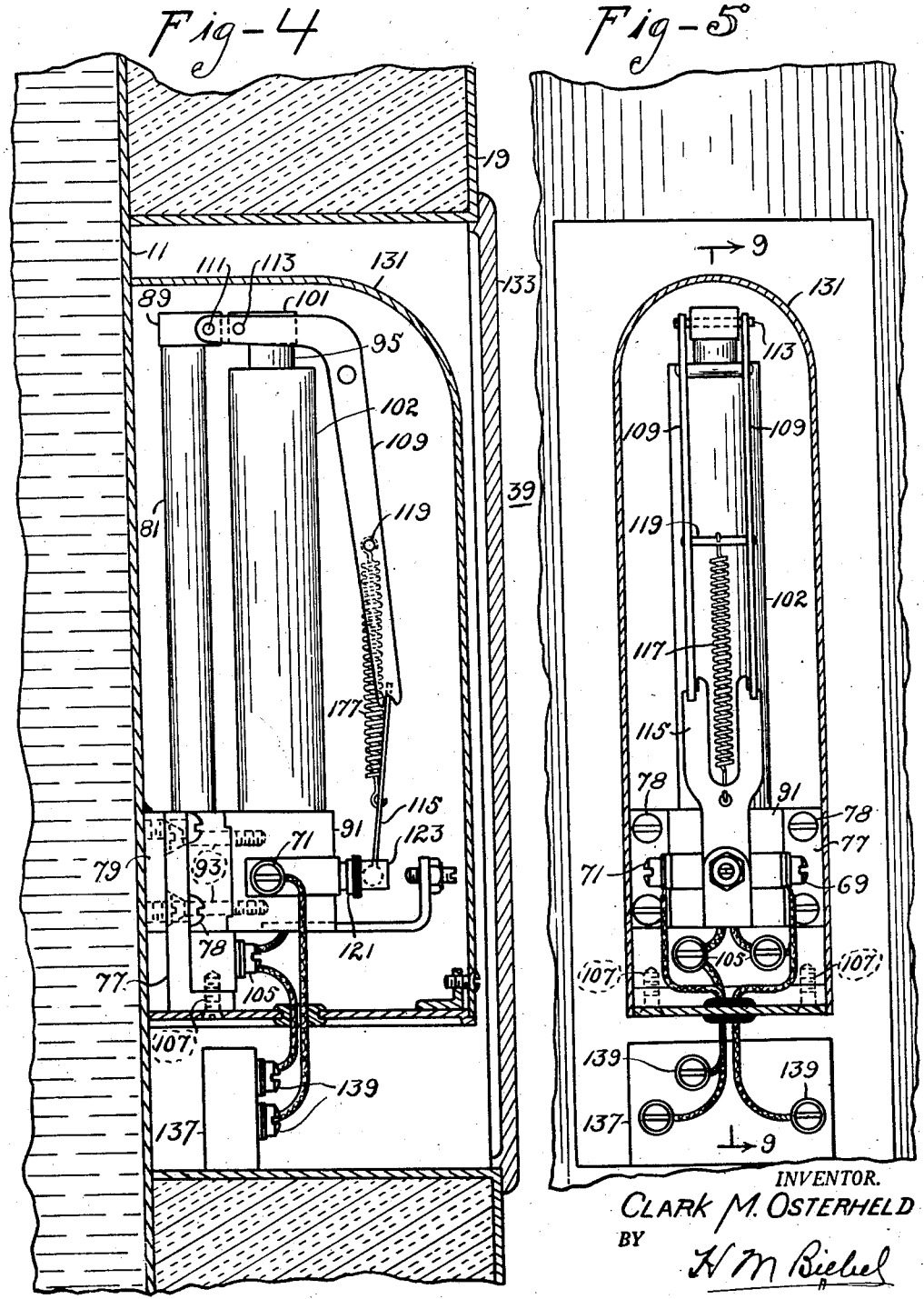

2,375,379

UNITED STATES PATENT OFFICE 2,375,379

WATER HEATER CONTROL SYSTEM AND THERMAL RETARDER THEREFOR

Clark M. Osterheld, Stoughton, Wis., assignor to McGraw Electric Company, Elgin, Ill., a corporation of Delaware Application November 22, 1943, Serial No. 511,386

20 Claims. (Cl. 219—39)

My invention relates to electric heating and particularly to the control of hot water heating systems.

An object of my invention is to provide a control system for a hot water tank that shall include a thermal retarder heater control switch unit for delaying energization of the heater for a preset time under certain operating conditions.

Another object of my invention is to provide a control system for a hot water tank that shall be effective to cause immediate energization of the heater at the start of an off-peak period in case a relatively large quantity of hot water has been withdrawn from the tank and that shall delay energization of the heater for a predetermined time period of delay in case a relatively small quantity only has been withdrawn from the tank.

Another object of my invention is to provide a thermal retarder heater control switch unit comprising a pair of dissimilarly thermally-responsive elements one of which is adapted to be subjected to the temperature of the water in the tank and the other of which is adapted to be heated by a heating coil and a heater control switch mechanically pivotally supported and actuable by said pair of elements.

Another object of my invention is to provide a thermal retarder heater control switch unit comprising a pair of dissimilarly thermally-responsive elements, one of which is mounted on a support adapted to be secured on a tank intermediate the ends thereof and the other of which is mounted on a heat-insulating support and a heater control switch adapted to be actuated by said elements to closed position when the first element is subject to cold water and the second element is at substantially room temperature and to be actuated to open position when the first element is subject to hot water and the second element is at substantially room temperature.

Other objects of my invention will either be apparent from a description of one form now preferred by me or will be pointed out in the course of such description and set forth particularly in the appended claims.

In the drawings,

Figure 1 is a sectional view of a hot water tank showing parts of my control system applied thereto, Fig. 2 is a diagram of the electric circuits of my improved control system, Fig. 3 is a fragmentary diagram of the electric circuit showing manual control of the retarding period, Fig. 4 is a fragmentary sectional view on an enlarged scale showing my improved thermal retarder in side view, Fig. 5 is a view in front elevation of the parts shown in Fig. 4, the section extending through the casing, Fig. 6 is a top plan view of the parts shown in Fig. 4 with the section extending through the casing, Fig. 7 is a section therethrough on the line 7—7 of Fig. 9, Fig. 8 is a fragmentary front view of part of Fig. 10 showing the control button, Fig. 9 is a vertical, sectional view taken on the line 9—9 of Fig. 5, and, Fig. 10 is a fragmentary view in side elevation of the parts shown in Fig. 9 under certain operating conditions.

I have illustrated in Figs. 1 and 2 a domestic hot water tank together with a diagram of connections of my improved control system and have elected to show a domestic hot water tank 11 which is provided with a lower cold water inlet 13 and an upper hot water outlet 15. The tank may be surrounded by any suitable heat-insulating material 17, such as mineral wool, and an outside casing 19 may be provided. Supports 21 may be provided all in a manner now well known in the art.

I provide preferably but not necessarily, a single electric heater 23 which may be of any suitable or desired type and is shown as being positioned in a tunnel member 25 all in a manner now well known in the art.

I provide a thermally-actuable heater control switch designated generally by the numeral 27 which is shown to comprise a tubular member 29 with a closed inner end having its outer end suitably secured in an opening in the tank 11 adjacent the lower end portion thereof in a water-tight manner. I provide an expansion rod 31 therein which is adapted to engage and move a resilient contact arm 33 having a contact member thereon adapted to engage with and be disengaged from a cooperating contact member on a relatively rigid contact arm 35. The two contact arms 33 and 35 are supported on the outside of the tank as by means of blocks 37 of electric-insulating material. The rod 31 is shown, in Fig. 1, as of relatively short length such as it will have when subject to cold water whereby the contact members or arms 33 and 35 will be in electric-conducting engagement with each other. I do not desire to be limited to the particular details shown, since these are illustrative only, but may use any other form of thermally actuable switch effective for the same purpose.

I provide also a thermal retarder heater control switch unit designated by numeral 39 which will be hereinafter described in detail.

I provide a continuously operative timer 41 comprising a subsynchronous motor having a worm 45 on its rotor shaft, which worm is adapted to engage a worm gear 47 which is mounted on a shaft 49 which shaft is provided with suitable bearings not shown in Fig. 2.

I provide a cam disc 51 on shaft 49 having the greater part of its peripheral surface of a fixed outside radius but having a portion thereof of a somewhat greater radius, which portion is designated by 53. The peripheral extent of portion 53 is substantially that of the usual after-midnight off-peak period, it being understood that the design of timer 41 is such that the cam disc 51 rotates through 360° during a twenty-four hour day.

I provide a heater circuit switch actuable by the cam disc 51 which switch includes a substantially rigid contact arm 55 and a resilient contact arm 57 which latter arm has a lug 59 of electric-insulating material secured thereto to be engaged by the cam disc 51. The two contact arms 55 and 57 may be held in proper operative positions relatively to each other by a block 61 of electric-insulating material. It is to be understood that the showing of timer 41 is general only and that I may use any timer-controlled switch effective for the same purpose.

An electric supply circuit includes conductors 63 and 65 and it will be noted that contact arm 55 is connected to conductor 63 while contact arm 57 is connected by a conductor 67 with a contact terminal 69 of the thermal retarder unit 39. A second terminal 71 of the thermal retarder unit is connected to one terminal of heater 23 by a conductor 73. The contact arm 35 is connected to the other terminal of resistor heater 23 while contact arm 33 is connected by conductor 75 with the supply circuit conductor 65.

It will be obvious that the entire control system is deenergized during the on-peak period which for illustrative purposes may be considered to extend from say 6 a. m. to on or about 12 midnight, the off-peak period being therefore on the order of six hours.

Referring now to Figs. 4 and 10 inclusive I have there illustrated one form of a thermal retarder heater control switch unit 39 constituting a means for delaying energization of the heater 23 under certain operating conditions. The thermal retarder 39 includes a bracket 77 which is of a metal or alloy having high heat conductivity and which may be secured in heat-conducting engagement with the outer surface of the tank at substantially the mid-portion thereof as by screws 78 having screw-threaded engagement with a block 79 of high heat-conducting metal or alloy secured to the tank 11 by welding seams 80 (see Fig. 9). On bracket 77 I provide a vertically-extending first expansion rod 81 of high expansion metal, such as aluminum, which in order that it may be in good heat-receiving relation relatively to the bracket 77, may have a reduced lower end portion 83 fitting tightly into a bore 85 in bracket 77. The upper end portion of rod 81 is provided with a reduced end portion 87 and a short laterally-extending lug or arm 89 is rigidly mounted thereon.

I provide a block 91 of heat-insulating material, which block may be of substantially rectangular shape in cross section which is secured against bracket 77 as by screws 93. I provide a second vertically-extending expansion rod 95 of lower thermal expansion, such as a nickel steel alloy, which has a central bore 97 therein and which has its lower end portion 99 extending into a circular aperture in block 91. The upper end portion of rod 95 is provided with a portion 100 of reduced diameter having a short arm or lug 101 thereon held rigidly by any suitable or desired means. A heat-insulating cover or outer casing 102 is provided around second rod 95. The two expansion rods extend parallel to each other.

While the expansion rod 81 is preferably made of aluminum and the second expansion rod 95 is preferably made of a nickel-iron alloy, so that its linear thermal expansion is less than that of rod 81 and may be one-half that of rod 81; I may use any other materials in place thereof, having the same relative linear-expansions.

I provide a low-wattage heating coil 103 within the bore 97, the end portions or leads of heater 103 being secured to terminals 105 on a block 107 of electric-insulating material secured to bracket 77. One terminal of coil 103 is connected to contact arm 35 by a conductor 108, while the other terminal of coil 103 is connected to conductor 67 and terminal 69 so that coil 103 is energized as soon as and when arms 57 and 55 of the timer switch and arms 35 and 33 are engaged with each other.

I desire to point out here that while I prefer to heat the second expansion rod 95 by radiant heat from coil 103, I do not desire to be limited thereto since I may use the coil 103 to effect heating of the second expansion rod 95 by electromagnetic effects such as hysteresis. This, of course, is dependent upon the use of alternating current to traverse the coil 103. While I may let the coil 103 remain in the bore 97, its electromagnetic heating effect will be relatively very small, and if found to be too small to effect the desired heating of the second rod 95 in the desired time I may locate the coil 103 around the outside of the rod 95. Where the words "heating coil" are used in the specification and in the claims it is to be understood that heating of the second expansion rod may be effected by radiant heat or by hysteresis and eddy current loss in the second rod or by current flow therethrough.

The front surface of block 91 of electric-insulating material is provided with contacts 69 and 71 hereinbefore referred to, held thereon in any desired manner.

A snap acting heater control switch includes a lever or toggle member 109, the two arms thereof being of unequal length, the member 109 being made of two spaced parallel arm portions each of substantially L-shape. The shorter arm portion is pivotally supported by suitable pins 111 and 113 in lugs 89 and 101. A second toggle arm 115 is pivotally connected with arms 109 at their lower end and an over center spring 117 extends to either side of the junction of arms 115 and arms 109, being secured to the arm 115 and to a cross bar 119 in arms 109.

Referring to Fig. 4 of the drawings I have there shown the position of a contact bridging member 121 which is insulatedly mounted on a block 123 secured to the lower end of arm 115, as being in engagement with contact members 71 and 69. The conditions as to temperature of the two expansion rods 81 and 95 is that either the temperature of the two rods is substantially that of the ordinary room, say on the order of 70° F., under which conditions the length of the two rods is substantially the same with the result that contact bridging member 121 is in engagement with contacts 69 and 71 and the switch is therefore in circuit-closing position. Further, Fig. 4 illustrates the position occupied by the contact bridging member 121 when the temperatures of expansion rods 81 and 95 are relatively high, that is when rod 81 is subject to the temperature of hot water in the tank 11, which for illustrative purposes may be taken as 150° F. to 170° F., while the temperature of rod 95 is such that its length is substantially equal to that of rod 81 having been heated by the energized coil 103 to a temperature on the order of 300° F.

Referring now to Fig. 9 of the drawings I have there illustrated the position of the snap acting switch and particularly of the contact bridging member 121 when rod 81 is subject to the temperature of hot water in the tank but coil 103 is either deenergized or has been energized for only a relatively short period of time. Block 123 is in engagement with a stop member comprising a bracket 125 held rigidly against block 91 and provided with an adjustable stop screw 127 having a lock nut 129 thereon. Under these conditions the switch is in deenergizing position.

My thermal retarder switch unit comprises a snap acting switch actuated by a pair of dissimilarly thermally-expansible elements, so that it may operate in the desired manner under operating conditions. Thus the switch must be in closed position when the tank is filled with cold water and the heating coil for rod 95 has been energized only a short time. If so much hot water has been withdrawn from the tank that the thermal retarder is subject to water having a temperature on the order of 115° and the heating coil for rod 95 has been energized only a short length of time, the switch must also be in closed position. If on the other hand the tank is full of hot water having a temperature of say 150° F. and has been standing under such condition for a length of time sufficient to cause the temperature of both rods 81 and 95 to reach a value of 150° F. or slightly less, the switch must remain in open position.

To cause the thermal retarder switch to move from the open to the closed position as when it is subject to hot water in the tank at a temperature of 150° F. or slightly more, the second expansion rod must be heated to a temperature of 300° F. or more, depending on its thermal expansivity as compared to that of the first rod 81.

The thermal retarder is provided with a casing 131 and as has already been hereinbefore stated is secured against the outer surface of the hot water tank 11 at substantially the mid-portion thereof in an opening in the outer casing 19 and the heat-insulating material 17 which opening may be closed by a closure 133. I may provide a substantially similar closure 135 for the lower thermal heater control switch 27.

I may provide further a block 137 of electric-insulating material which may rest upon a portion of the outer case 19 and have terminal members 139 mounted thereon in order to permit of connecting outside electric circuits thereto.

Let it now be assumed that the tank 11 has just been filled with cold water. If it be assumed that such filling was done during the onpeak period, contact arms 55 and 57 would be out of electrical engagement or connection with each other, but just as soon as cam disc portion 53 engaged lug 59 on arm 57 closure of the circuit would be effected since rod 81 would be relatively short (being at the temperature of the cold water), rod 95 would also be relatively short since it would also be at substantially room temperature and rod 31 would also be at the temperature of the cold water with the result that contact arms 33 and 35 would be in electrical engagement. The result of this would be that energization of heater 23 would be effected immediately upon closure of the timer controlled switch.

Heating of the water in the tank would therefore progress and it would be expected that substantially all of the water in the tank would be heated before or by the end of the off-peak period. When substantially all of the water in the tank is hot, the first thermally-actuable heater control switch 27 will open to interrupt the heater circuit.

Energization of the small heater 103 within expansion rod 95 would also have been effected simultaneously with the closure of the timer controlled switch and it may be assumed, for illustrative purposes, that a rheostat control of the current in the small heating coil 103 effected by a rheostat 141 supported on a bracket 143, adjustable manually, was made such that it would take say on the order of four hours before the temperature rise of expansion rod 95 would be such that its length would be substantially that of expansion rod 81 which is subject to the temperature of the water in the tank. If the thermal retarder 39 is supported on the tank at substantially the mid-portion thereof, the thermal retarder would be subject to the temperature of hot water at about the end of about three hours and rod 95 would not be fully expanded when rod 81 is fully expanded and the switch would be moved to the open circuit position shown in Fig. 9. This would deenergize the heater 23 temporarily until the second expansion rod 95 has been heated to its maximum temperature, which would occur one hour later. This would cause reclosing of the thermal retarder switch and reenergization of the heater 23, which reenergization would continue until opening of the timer controlled switch at the end of the off-peak period.

Let it be assumed that at 12 midnight, the start of the off-peak period and the closure of the timer controlled switch, only a relatively small amount of hot water has been withdrawn from the tank just sufficient to subject the lower thermal switch 27 to cold water. In this case contact arm 33 will have been moved into engagement with contact arm 35, expansion rod 81 will still be subject to hot water and rod 95 will be relatively short, that is at the start of the off-peak period. In this case energization of the small heater 103 in rod 95 will continue for a period of say substantially four hours until rod 95 expands sufficiently to cause closure of the thermal retarder switch and energization of the heater 23 for a short length of time, on the order of two hours, which is sufficient to heat the water in the lower end portion of the tank before the timer controlled switch is again moved to open position.

Let it be assumed, on the other hand, that sufficient hot water was withdrawn from the tank so that the thermal retarder was subject to cold water with the result that the thermal retarder switch was also in closed position as well as the lower thermal heater controlled switch 27. The result would be that the heater 23 would be energized substantially immediately upon closure of the timer controlled switch at the start of an off-peak period. If it would require say only two hours to heat up enough water to subject the thermal retarder to hot water, the thermal retarder switch might be temporarily moved to open position but with the continued energization of the heater 103 expansion of rod 95 would continue until the thermal retarder switch would again be moved to circuit-closing and therefore heater-energizing position, with the result that heating of the water in the lower portion of the tank, that is below the thermal retarder, would continue until substantially all of the water in the tank would be heated to a predetermined temperature, say 150° F., before the end of an off-peak period.

It is obvious that changes may be made in the adjustment of the rheostat 141 to vary the timer required to raise the temperature of the second expansion rod to its maximum value and that the wattage of the tank heater 23 has an effect on the length of time required to heat the water in the tank, the greater the wattage of the heater the shorter the time necessary to heat all of the water to a temperature of 150° F.

It is therefore obvious that my improved control system and particularly the thermal retarder heater control switch unit provides a relatively simple and highly efficient means for permitting immediate energization of the tank heater in case a relatively large amount of hot water was withdrawn from the tank during the day and delaying energization of the tank heater for an adjustably predetermined delay period of time in case only a relatively small amount of hot water was withdrawn from the tank during the day.

It is further obvious that the thermal retarder switch unit comprises a snap acting switch actuable jointly by two dissimilarly thermally-expansible elements, of rod-shape, one of which is subjected to the temperature of water in the tank and the other of which is subjected to heat from a heating coil operatively associated therewith, the energization of the heating coil being controlled by a timer controlled switch and by a heater control switch.

It is further obvious that while the timer is shown as being provided with means for fixing a single off-peak period only, two or more off-peak periods may be fixed thereby.

Various modifications may be made in the system embodying my invention without departing from the spirit and scope thereof and all such modifications coming clearly within the scope of the appended claims shall be considered as being covered thereby.

I claim as my invention:

1. A water heater control system for a domestic hot water tank subject to withdrawals of hot water during a twenty-four hour day comprising an electric heater adapted to be energized by an electric circuit having reduced demands for energy after midnight, a thermally-responsive heater control switch subject to tank water temperature at the lower end portion of the tank, a thermal retarder heater control switch unit mounted in heat-conducting relation to the tank intermediate its ends and including a first expansion rod subject to tank water temperature, a second expansion rod, a heating coil for said second rod, a heater control switch actuable by said two rods, a continuously operative timer and a heater circuit switch adapted to be closed by said timer during said period of reduced demand, said two heater control switches and said circuit switch being jointly effective to cause energization of said electric heater simultaneously with the closing of the circuit switch in case the thermal retarder is subject to cold water and said thermally-responsive heater control switch being effective to cause deenergization of said electric heating means when the tank is full of hot water.

2. An off-peak water heating system for a hot water tank having an electric heater, comprising a continuously operative timer, a first heater control switch adapted to be moved into and held in closed position by said timer during an off-peak period, a second heater control switch in series circuit with said timer-controlled switch subject to tank water temperature adjacent to the lower portion of the tank and adapted to be moved into closed position when subject to cold water, a third heater control switch in series circuit with said first and second switches and means to cause closing of said third switch with a predetermined time delay period after the start of an off-peak period in case said second switch only is subject to cold water, said means comprising a first thermally-expansible means adapted to be mounted on a tank intermediate the ends thereof, a second thermally-expansible means heat insulated from the tank, a heating coil for said second thermally-expansible means controlled by said timer controlled switch and said second switch to be energized at the start of an off-peak period to cause thermal expansion of said second thermally-expansible means and closing of said third switch after a predetermined time delay period with attendant energization of said electric heater.

3. A water heater control system for a domestic hot water tank subject to withdrawals of hot water during a twenty-four hour day comprising an electric heater adapted to be energized by an electric circuit having reduced demands for energy after midnight, a thermally-responsive heater control switch subject to tank water temperature at the lower end portion of the tank, a thermal retarder heater control switch unit mounted in heat-conducting relation to the tank intermediate its ends and including a first expansion rod subject to tank water temperature, a second rod, a heater control switch actuable by said two rods, a continuously operative timer and a heater circuit switch adapted to be closed by said timer during said period of reduced demand, said two heater control switches and said switch being jointly effective to cause energization of said electric heater simultaneously with the closing of the circuit switch in case the thermal retarder is subject to cold water.

4. A water heater control system for a domestic hot water tank subject to withdrawals of hot water during a twenty-four hour day comprising an electric heater adapted to be energized by an electric circuit having reduced demands for energy after midnight, a thermally-responsive heater control switch subject to tank water temperature at the lower end portion of the tank, a thermal retarder switch unit mounted in heat conducting relation to the tank intermediate its ends and including a first expansion rod subject to tank water temperature, a second expansion rod, a heating coil for said second rod, a heater control switch actuable by said two rods, a continuously operative timer and a heater circuit switch adapted to be closed by said timer during said period of reduced demand, said two heater control switches and said heater circuit switch being jointly effective to cause energization of said electric heater with a predetermined period of time delay after closing of said circuit switch in case the thermal retarder is subject to hot water.

5. A system as set forth in claim 4 and including means for varying said predetermined period of time delay.

6. A water heater control system for a domestic hot water tank having an electric heater, comprising an off-peak timer-controlled heater-control switch, a thermally-responsive heater control switch adapted to be subjected to tank water temperature at the lower portion of the tank and a thermal-retarder heater control switch comprising a pair of dissimilarly thermally-responsive elements, one of which is adapted to be subjected to tank water temperature intermediate the ends of the tank.

7. A water heater control system for a domestic hot water tank having an electric heater, comprising an off-peak timer-controlled heater-control switch, a thermally-responsive heater control switch adapted to be subjected to tank water temperature at the lower portion of the tank and a thermal-retarder heater control switch adapted to be subjected to tank water temperature intermediate the ends of the tank, said three switches being connected in series circuit with each other to jointly control said heater, and said thermal retarder switch being effective to cause energization of said heater immediately after closure of the off-peak switch in case of predetermined conditions as to the amount of hot water in the tank.

8. A water heater control system for a domestic hot water tank having an electric heater, comprising an off-peak timer-controlled heater-control switch, a thermally-responsive heater control switch adapted to be subjected to tank water temperature at the lower portion of the tank and a thermal-retarder heater control switch adapted to be subjected to tank water temperature intermediate the ends of the tank, said three switches being connected in series circuit with each other to jointly control the heater, and said thermal retarder switch being effective to cause energization of said heater immediately after closure of the off-peak switch in case of predetermined conditions as to the amount of hot water in the tank and being effective to cause energization of said heater with a predetermined time delay period under other predetermined conditions as to the amount of hot water in the tank.

9. A water heater control system for a domestic hot water tank having an electric heater, comprising an off-peak timer-controlled heater-control switch, a thermally-responsive heater control switch adapted to be subjected to tank water temperature at the lower portion of the tank and a thermal-retarder heater control switch adapted to be subjected to tank water temperature intermediate the ends of the tank, said three switches being electrically connected in series circuit with each other and with the electric heater and said thermally-responsive switch being effective to deenergize said heater when substantially all of the water in the tank is hot.

10. A water heater control system for a hot water tank having an electric heater, comprising a thermally-responsive heater control switch adapted to be subjected to tank water temperature at the lower portion of the tank and a thermal retarder heater control switch unit including a first thermo-sensitive element adapted to be subjected to heat exchange with the tank water intermediate the ends of the tank and a second thermo-sensitive element subject to heat exchange independent of the tank water.

11. A water heater control system for a hot water tank having an electric heater, comprising a thermally-responsive heater control switch subject to tank water temperature at the lower end portion of the tank and a thermal retarder heater control switch including a first thermo-sensitive element subject to heat exchange with the tank water intermediate the ends of the tank, a second thermo-sensitive element subject to heat exchange independent of the tank water and auxiliary means for exchange of heat with said second element.

12. A water heater control system for a hot water tank having an electric heater, comprising a thermally-responsive heater control switch subject to tank water temperature at the lower end portion of the tank and a thermal retarder heater control switch including a first thermo-sensitive element subject to heat exchange with the tank water intermediate the ends of the tank, a second thermo-sensitive element subject to heat exchange independent of the tank water and an auxiliary heating coil for said second element.

13. A water heater control system for a hot water tank having an electric heater, comprising a heater circuit adapted to be connected to an electric supply line, a thermally-responsive heater control switch for the circuit adapted to be subjected to tank water temperature at the lower portion of the tank, a thermal retarder heater control switch unit for the circuit including a first thermo-sensitive element adapted to be subject to heat exchange with tank water intermediate the ends of the tank, a second thermo-sensitive element subject to heat exchange applied independently of tank water and means controlled by power from the circuit for exchanging heat with said second element.

14. A water heater control system for a hot water tank having an electric heater, comprising a heater circuit adapted to be connected to an electric supply line, a thermally-responsive heater control switch for the circuit adapted to be subjected to tank water temperature at the lower portion of the tank, a thermal retarder heater control switch for the circuit including a thermo-sensitive element adapted to be subjected to heat exchange with the tank water intermediate the ends of the tank and heat control means operated by power from the circuit for modifying the effect of the thermo-sensitive element to vary the operation of the retarder switch.

15. A water heater control system for a hot water tank having an electric heater, comprising a thermally-responsive heater control switch adapted to be subjected to tank water temperature at the lower end portion of the tank and a thermal retarder heater control switch unit including a first thermo-sensitive element adapted to be subjected to heat exchange with tank water intermediate the ends of the tank and a second thermo-sensitive element having a heating means controlled by the thermally-responsive heater control switch to vary the operation of the retarder switch.

16. A water heater control system for a hot water tank having an electric heater, comprising a heater circuit for connection to an electric supply line and two dependent switch units for opening and closing the heater circuit, the first switch unit including a thermo-sensitive element adapted to be subject to tank water temperature at the lower end of the tank and a second switch unit including a first thermo-sensitive element adapted to be subject to tank water temperature intermediate the ends of the tank and a second thermo-sensitive element cooperating with the first element to vary the opening and closing of the second switch unit and operated by power from the circuit when the first switch unit is closed.

17. A water heater control system for a hot water tank having an electric heater, comprising a heater circuit for connection to an electric supply line, a timer-controlled switch for said circuit adapted to be closed during off-peak hours, a thermally-responsive control switch for said circuit adapted to be subject to tank water temperature at the lower end of the tank, a thermal retarder control switch for said circuit adapted to be mounted in heat-conducting relation to the tank above said thermally-responsive switch and including two dissimilarly thermally-responsive elements, the first of which is subject to heat exchange with tank water and the second of which is subject to heat exchange means independent of the tank water and operated by power from the circuit when said timer-controlled switch and said thermally-responsive switch are both closed.

18. A water heater control system for a hot water tank having an electric heater, comprising a heater circuit for connection to an electric supply line, a timer-controlled switch for said circuit adapted to be closed during off-peak hours, a thermally-responsive control switch for said circuit adapted to be subject to tank water temperature at the lower end of the tank, a thermal retarder control switch for said circuit adapted to be mounted in heat-conducting relation to the tank above said thermally-responsive switch and including two dissimilarly thermally-responsive elements, the first of which is subject to heat exchange with tank water and the second of which is subject to heat exchange means independent of the tank water and operated by power from the circuit when said timer-controlled switch and said thermally-responsive switch are both closed and effective to cause energization of said heater immediately after closure of said timer-controlled switch in case said first thermally-responsive element is subject to cold water.

19. A water heater control system for a hot water tank having an electric heater, comprising a heater circuit for connection to an electric supply line, a timer-controlled switch for said circuit adapted to be closed during off-peak hours, a thermally-responsive control switch for said circuit adapted to be subject to tank water temperature at the lower end of the tank, a thermal retarder control switch for said circuit adapted to be mounted in heat-conducting relation to the tank above said thermally-responsive switch and including two dissimilarly thermally-responsive elements, the first of which is subject to heat exchange with tank water and the second of which is subject to heat exchange means independent of the tank water and operated by power from the circuit when said timer-controlled switch and said thermally-responsive switch are both closed and effective to cause energization of said heater immediately after closure of said timer-controlled switch in case said first thermally-responsive element is subject to cold water and effective to cause energization of said heater with an adjustably predetermined time delay period in case only said thermally-responsive control switch is subject to cold water.

20. A water heater control system for a hot water tank having an electric heater, comprising a heater circuit for connection to an electric supply line, a timer-controlled switch for said circuit adapted to be closed during off-peak hours, a thermally-responsive control switch for said circuit adapted to be subject to tank water temperature at the lower end of the tank, a thermal retarder control switch for said circuit adapted to be mounted in heat-conducting relation to the tank above said thermally-responsive switch and including two dissimilarly thermally-responsive elements, the first of which is subject to heat exchange with tank water and the second of which is subject to heat exchange means independent of the tank water and operated by power from the circuit when said timer-controlled switch and said thermally-responsive switch are both closed and effective to cause energization of said heater immediately after closure of said timer-controlled switch in case said first thermally-responsive element is subject to cold water and effective to cause energization of said heater with an adjustably predetermined time delay period in case only said thermally-responsive control switch is subject to cold water, said thermally-responsive control switch being effective to cause deenergization of said heater when substantially all of the water in the tank is hot.

CLARK M. OSTERHELD.